US008925364B2

(12) United States Patent
Gupta

(10) Patent No.: US 8,925,364 B2
(45) Date of Patent: Jan. 6, 2015

(54) CLOSING TOOL FOR CRIMP COVER

(71) Applicant: Nikhil Gupta, Schaumburg, IL (US)

(72) Inventor: Nikhil Gupta, Schaumburg, IL (US)

( * ) Notice: Subject to any disclaimer, the term of this patent is extended or adjusted under 35 U.S.C. 154(b) by 0 days.

(21) Appl. No.: 14/156,956

(22) Filed: Jan. 16, 2014

(65) Prior Publication Data

US 2014/0202226 A1 Jul. 24, 2014

Related U.S. Application Data

(60) Provisional application No. 61/754,311, filed on Jan. 18, 2013.

(51) Int. Cl.
*B21D 53/44* (2006.01)
*B23P 19/04* (2006.01)
*A44C 27/00* (2006.01)
*B25B 7/02* (2006.01)

(52) U.S. Cl.
CPC ................ *A44C 27/00* (2013.01); *B21D 53/44* (2013.01); *B25B 7/02* (2013.01)
USPC ......... 72/409.19; 72/409.01; 29/267; 29/270; 29/896.4; 81/300; 81/424.5; 81/427

(58) Field of Classification Search
USPC ........... 72/409.01, 409, 18, 19; 29/9, 10, 267, 29/270, 896.4, 896.42; 81/3, 6, 300, 421, 81/424.5, 426, 427
See application file for complete search history.

(56) References Cited

U.S. PATENT DOCUMENTS

| | | | | |
|---|---|---|---|---|
| 376,493 | A * | 1/1888 | Vannatter et al. | 86/22 |
| 1,442,486 | A * | 1/1923 | Looke | 72/409.19 |
| 1,482,888 | A * | 2/1924 | Converse | 72/51 |
| 2,571,819 | A * | 10/1951 | Boel et al. | 81/426 |
| 2,651,958 | A * | 9/1953 | Deline | 72/360 |
| 2,753,741 | A * | 7/1956 | Riley | 72/409.13 |
| 2,920,514 | A * | 1/1960 | McKeehan et al. | 72/409.04 |
| 3,175,281 | A * | 3/1965 | Elfsten | 29/890.144 |
| 4,796,318 | A * | 1/1989 | Bigej | 7/106 |
| 6,941,628 | B1 * | 9/2005 | Silverfox | 29/267 |

* cited by examiner

*Primary Examiner* — David B Jones
(74) *Attorney, Agent, or Firm* — Robert S. Alexander

(57) ABSTRACT

A crimp cover closing tool is provided with a pair of curved force transmitting members joined at a fulcrum and forming opposed jaws. The jaws each have an angularly offset tip with interiorly disposed opposable spherical forming surfaces, a radius of curvature of about 2.1 mm and a depth of about 1.5 mm. The overall length of the tool is about 130 mm. The opposable spherical forming surfaces are spaced from the fulcrum by a distance of at least 30 mm. The tip of the forming tool has an angle of offset of about 30°.

5 Claims, 1 Drawing Sheet

20
22
24
26
28
30
[5.118]
129.99
[0.118]
3
[0.165]
4.19
30°

CLOSING TOOL FOR CRIMP COVER

CLAIM FOR PRIORITY

This non-provisional application claims the benefit of the filing date of U.S. Provisional Patent Application Ser. No. 61,754,311, of the same title, filed Jan. 18, 2013. The priority of U.S. Provisional Patent Application Ser. No. 61,754,311 is hereby claimed and the disclosure thereof is incorporated into this application by reference.

Many hobbyists have taken up beading as a past time, making decorative jewelry and ornamental objects for their families and friends as well as themselves. One of the most common operations formed by beaders is wire crimping which is used to join the ends of the loops in a wide variety of applications including formation of necklaces, earrings, bracelets bangles and the like. To form a strong durable join between two pieces of wire, beaders will typically use a so-called crimp tube which is quite effective in forming the desired bond or join but typically lacks the aesthetic appeal of the other elements in the necklace, bracelet or earring. Thus beaders often cover the crimp tube with a crimp cover which is typically a small (2-6 mm, more commonly 3-5 mm) hollow split spherical shell, thus disposing an attractive, ornamental cover over the strong and durable but usually crudely formed crimped tube. However crimp tube covers are quite fragile and in the past have required considerable skill and delicacy to close without deforming the crimp tube cover and thereby defeating the entire purpose of using the crimp tube cover in the first place. Further, crimp tube covers are quite small and can not only be difficult to pick up but difficult to dispose around the crimp tube to be covered. Accordingly, I have invented a specialty tool to be used in beading which not only makes it easier to pick up the crimp tube cover but also to dispose it around the crimp tube to be covered and then close the crimp tube cover without deforming it from its intended aesthetic shape. In particular, my closing tool for crimp covers resembles a pair of needle nose pliers with an offset angle tip but combines the following features: a smooth forming surface having a radius of curvature of about 2.1 mm and a depth of about 1.5 mm is disposed in the angled tip of the closing tool with the center of the forming surface being disposed between about 10 mm and 50 mm from the fulcrum of the closing tool. Inasmuch as the tip is offset at angle of approximately 30° from the longitudinal axis of the crimp cover closing tool, it is quite easy to pick up and retain a crimp cover in the spherical form in surface with the split in the crimp cover oriented toward the mouth of the crimp cover closing tool such that the wire join to be covered is easily inserted within the split of the crimp cover. In preferred embodiments, the spherical surface is between 10 and 50 mm away from the fulcrum of the crimp cover closing tool which has an overall length of between 100 and 150 millimeters so that the beader is able to carefully modulate the force applied to the crimp cover and thereby avoid deforming it while placing and closing it with great precision.

BRIEF DESCRIPTION OF THE DRAWINGS

The invention is described in detail below with reference to the various Figures, wherein.

DESCRIPTION OF THE PREFERRED EMBODIMENT

Figures 1, 2, 3, 4, 5, 6, 7, 8, 9, 10, 11, 12:
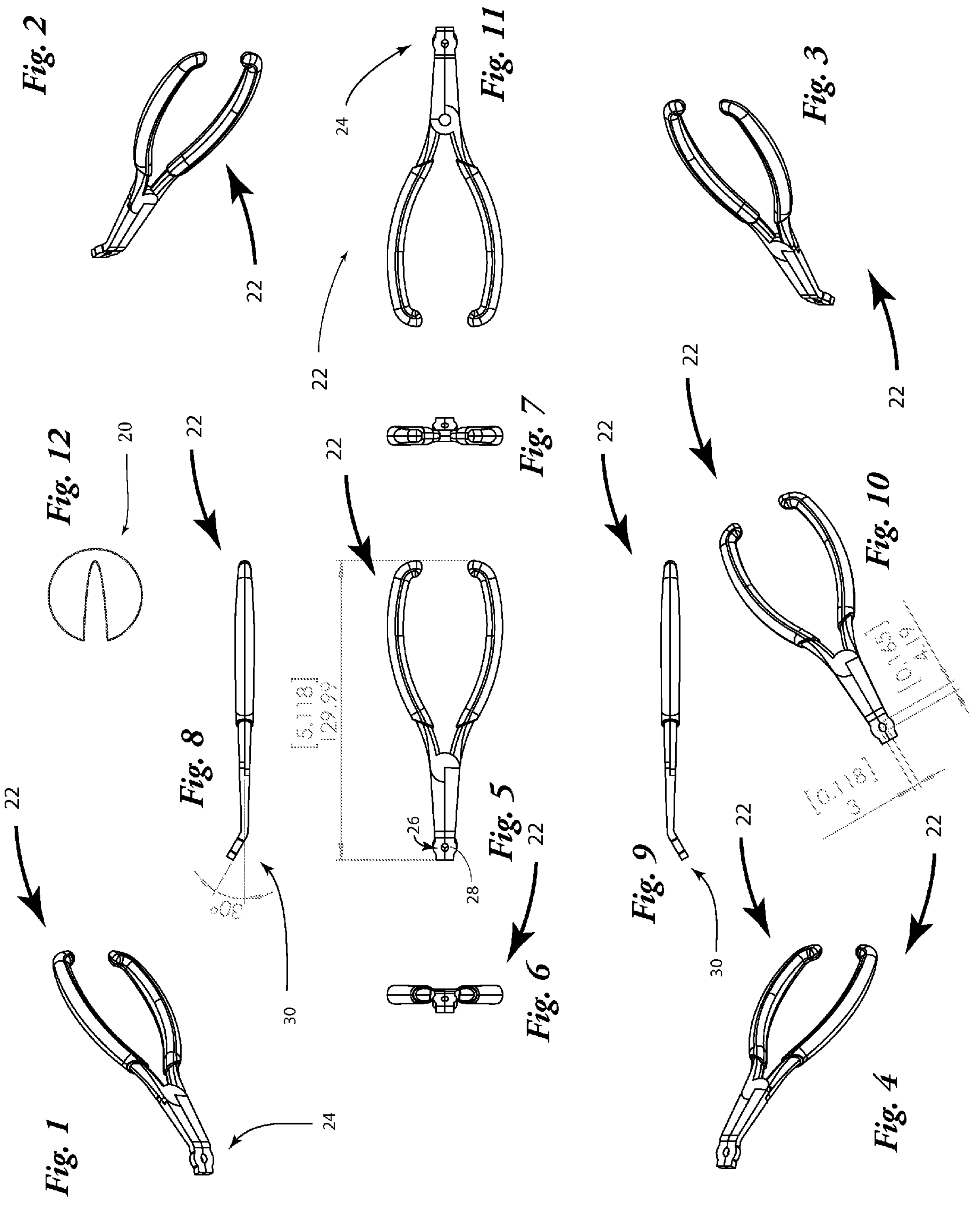
FIGS. 1-4 are schematic isometric perspectives illustrating a crimp cover closing tool of the present invention.
FIG. 5 is a top plan view of a crimp cover closing tool of the present invention.
FIGS. 6 and 7 are, respectively, left and right side elevations of the crimp cover closing tool of the present invention.
FIGS. 8 and 9 are, respectively, front and rear elevations of the crimp cover closing tool of the present invention.
FIG. 10 is a schematic illustrating the geometry of the forming surface of the crimp cover closing tool of the present invention as well as its displacement from the fulcrum thereof.
FIG. 11 is a bottom plan view of a crimp cover closing tool of the present invention.
FIG. 12 is a schematic illustrating the thin spherical shell comprising a crimp cover.

The invention is described in detail below with reference to several embodiments. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning.

Crimp cover 20 as depicted in FIG. 12 is a very thin almost spherical shell between about 2 and 6 mm in diameter, more commonly between three and 5 mm in diameter. When the ends of the wire in a jewelry item are joined by placing them in a crimp tube and subsequently crimping that crimp tube to form a strong mechanical bond between the two wires, the crimped crimp tube is usually close to unsightly, detracting from the aesthetic appearance of the jewelry item. Accordingly, beaders use crimp covers to hide the crimped crimp tube and thereby enhance the aesthetic attractiveness of the jewelry item formed thereby. However it can be appreciated that grasping, accurately positioning and closing crimp tube cover 20 without spoiling its appearance can be very tricky particularly if conventional tools such as needle nose pliers are employed, as these typically have gripping ridges formed near their tips which can mar the surface of the crimp tube cover as significant force can be required simply to maintain the crimp tube in the jaws of the needle nose pliers. Carefully modulating the force applied can present significant difficulties to the beader, particularly if elderly or afflicted with arthritis or other joint infirmities. The crimp tube cover closing tool 22 of the present invention alleviates these difficulties by providing a forming surface 24 comprising a pair of opposed spherical recesses 26 and 28 (technically speaking, recessed surfaces having a shape generally congruent to a portion of the surface of a sphere) in which the crimp cover 20 can be retained. Further by providing the offset tip 30 as shown in FIGS. 8 and 9, it becomes possible to more easily retrieve a crimp cover 20 from a flat surface and position it properly so that the mouth of the crimp cover is generally oriented in the same direction as the opening of the jaws in the crimp cover closing tool 22. Thus the beader can easily grasp the crimp cover 20 in the proper orientation, maneuver it over the crimp tube to be covered and then close the crimp cover 20 around the crimp tube without deforming excessively or marring its surface.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part.

Furthermore, those of ordinary skill in the art will appreciate that the foregoing description is by way of example only, and is not intended to limit the invention.

What is claimed is:

1. A crimp cover closing tool comprising a pair of curved force transmitting members joined at a fulcrum and forming opposed jaws having an angularly offset tip with interiorly disposed opposable spherical forming surfaces, each having a radius of curvature of about 2.1 mm and having a depth of about 1.5 mm, the overall length of said crimp cover closing tool being about 130 mm, the opposable spherical forming surfaces being spaced from the fulcrum by a distance of at least 30 mm, the angle of the offset of the tip of the forming tool being about 30°.

2. A crimp cover closing tool comprising a pair of curved force transmitting members joined at a fulcrum and forming opposed jaws having an angularly offset tip with interiorly disposed opposable spherical forming surfaces, each having:

a radius of curvature of between about 1.5 and 3 mm and a depth of between about 0.75 and 2.5 mm;

with the overall length of said crimp cover closing tool being between about 90 and 155 mm; the opposable spherical forming surfaces being spaced from the fulcrum by a distance of at least 20 mm, and the angle of the offset of the tip of the forming tool being between 20 and 40°.

3. The crimp cover closing tool of claim 2, wherein each of said interiorly disposed opposable spherical forming surfaces has a radius of curvature of between about 1.75 and 2.5 mm and has a depth of between about 1.25 and 2.0 mm, the overall length of said crimp cover closing tool being between about 100 and 150 mm, the opposable spherical forming surfaces being spaced from the fulcrum by a distance of at least 25 mm, and the angle of the offset of the tip of the forming tool being between about 25 and 35°.

4. The crimp cover closing tool of claim 2, wherein each of said interiorly disposed opposable spherical forming surfaces has a depth of between about 1.25 and 1.75 mm, the overall length of said crimp cover closing tool being between about 110 and 150 mm, and the opposable spherical forming surfaces being spaced from the fulcrum by a distance of at least 30 mm.

5. A crimp cover closing tool comprising a pair of curved force transmitting members joined at a fulcrum and forming opposed jaws having an angularly offset tip with interiorly disposed opposable spherical forming surfaces, each having a radius of curvature of between about 1.25 to 5 mm and having a depth of between about 0.5 and 2.5 mm, the overall length of said crimp cover closing tool being between about 75 and 175 mm, the opposable spherical forming surfaces being spaced from the fulcrum by a distance of at least 15 mm, and the angle of the offset of the tip of the forming tool being between 15 and 45°.

* * * * *